United States Patent [19]

Porter

[11] 4,086,112
[45] Apr. 25, 1978

[54] METHOD OF PRINTING FABRICS

[75] Inventor: Kenneth Porter, Harrogate, England

[73] Assignee: Imperial Chemical Industries Limited, London, England

[21] Appl. No.: 687,325

[22] Filed: May 17, 1976

[30] Foreign Application Priority Data

Jan. 20, 1976 United Kingdom ............... 2172/76
Jan. 26, 1976 United Kingdom ............... 2887/76

[51] Int. Cl.² ........................................... B32B 31/20
[52] U.S. Cl. ........................................ 156/73.1; 8/2;
  8/2.5 R; 156/234; 156/238; 156/277; 156/290;
  428/198; 428/207
[58] Field of Search ................... 156/277, 73.1, 234,
  156/238, 240, 309, 290; 8/2 R, 2.5, 2.5 A;
  68/355; 428/198, 207

[56] References Cited

U.S. PATENT DOCUMENTS

| 3,562,041 | 2/1971 | Robertson | 156/73.1 |
|---|---|---|---|
| 3,589,966 | 6/1971 | Gardner | 156/240 |
| 3,695,821 | 10/1972 | Kuroki et al. | 8/2 |
| 3,724,997 | 4/1973 | Eltz et al. | 8/2 |
| 3,980,512 | 9/1976 | Rauser | 156/240 |
| 3,984,273 | 10/1976 | Said | 156/240 |
| 4,018,066 | 4/1977 | Fennekels | 8/2.5 A |
| 4,018,557 | 4/1977 | Glover | 8/2.5 A |
| 4,018,955 | 4/1977 | Klauke et al. | 156/580.1 |
| 4,021,591 | 5/1977 | DeVries | 8/2.5 A |

FOREIGN PATENT DOCUMENTS 1,113,695  5/1968  United Kingdom ............... 156/240

Primary Examiner—Edward G. Whitby
Attorney, Agent, or Firm—Cushman, Darby & Cushman

[57] ABSTRACT

The invention provides a method of bonding and simultaneously printing a fabric, for example a non-woven web, by contacting the surface of the fabric with an ink comprising a dyestuff supported on a transfer sheet and subjecting discrete areas of the combination to heat and pressure. It is found in many cases that dye is strongly fixed, and that compared to conventional heat-transfer printing the method permits much shorter residence times and the possibility of using an extended range of dyestuffs.

7 Claims, 1 Drawing Figure

U.S. Patent     April 25, 1978     4,086,112
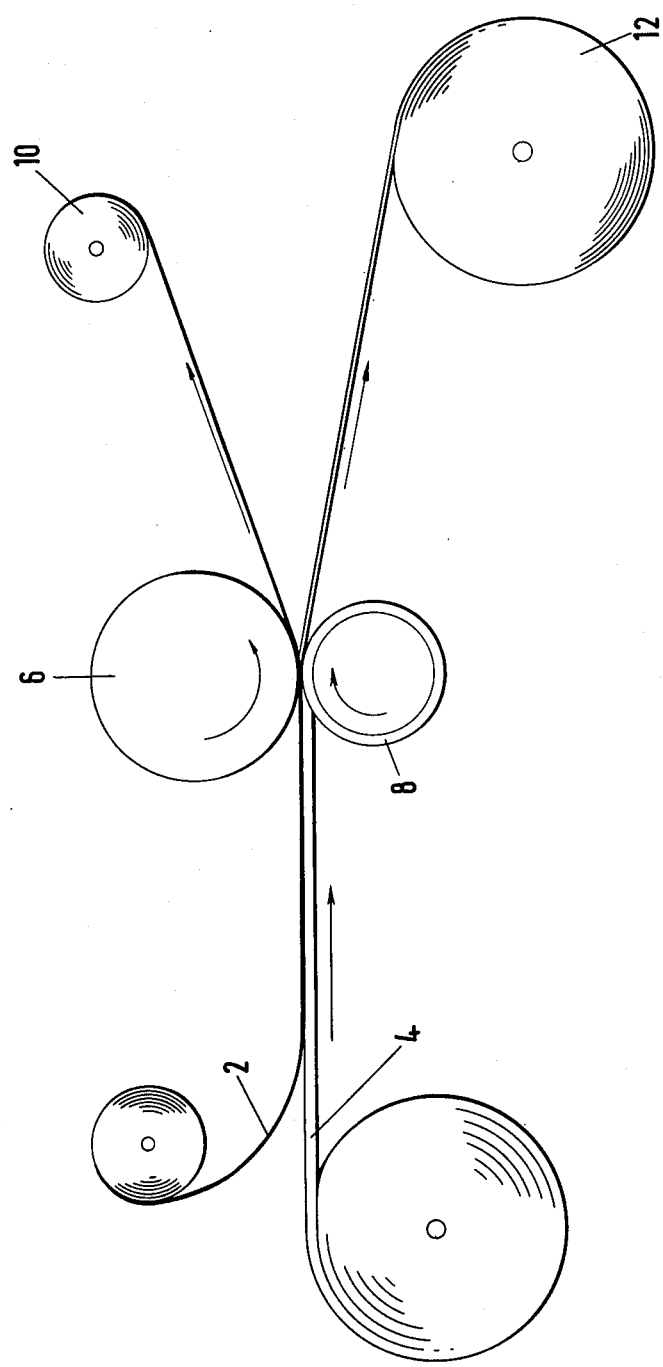

METHOD OF PRINTING FABRICS

The invention relates to a method of bonding fabrics.

It is known to bond a fabric such as a non-woven web in discrete spaced apart areas. For example, calender presses with raised lands on at least one roll have been described as providing means for bonding, in spaced apart areas, non-woven webs comprising thermoplastic material and have been found to produce non-woven fabrics which have improved drape compared with fabrics in which bonds occur throughout the web between contiguous fibres. Elsewhere the use of ultrasonic energy to bond fabrics between an ultrasonically energized horn and an anvil having a pattern of raised lands has been described. In order to produce a commercially acceptable product is is often necessary to dye or print fabrics thus produced as a separate operation.

The heat-transfer printing process, also known as vapor-phase, dry-heat or thermo-printing, involves bringing a fabric containing or consisting of synthetic thermoplastic fibres into association with disperse dyes supported on an inert sheet, such as paper, and subjecting sheet, dyes, and fabric to controlled conditions of temperature and pressure, so that the dyes sublime, transfer in the vapor phase to the fabric and are sorbed into the synthetic fibres thereof. More recent proposals, in which liquid materials, such as solutions of inorganic acids, are incorporated in the fabric in order to trap and fix the transferred dyes, have permitted heat-transfer printing techniques to be extended to classes of dyes other than disperse dyes. The latter processes however require special pre-treatment of the fabrics and subsequent washing off to remove the added chemicals, both of which add to the cost of the printing process.

The amount of dyestuff transferred depends on the time during which conditions permitting transfer operate (which we refer to as the "residence time") and upon the temperature. Residence times in excess of 15 seconds are common. Attempts to reduce residence times by increasing temperature have not been successful, however, since degradation and fusing of the fabric occur causing an unattractive glazed or glossy appearance.

We have now discovered that a fabric can be bonded and printed in one operation without noticeably glazing the fabric and that this may be done with disperse dyestuffs, and in a simplified way with other classes of dyestuffs. According to one aspect of the invention, therefore, we provide a method of bonding a fabric consisting of or including distributed meltable thermoplastic material wherein a transfer sheet supporting an ink comprising heat transferable dyestuff is contacted with said fabric, and sheet and fabric are subjected to heat and pressure in spaced discrete areas whereby said thermoplastic material becomes adhesive and bonds said fabric and also dyestuff is transferred onto the fabric at least in areas corresponding to said discrete areas.

The method of the invention will usually be utilised in connection with the bonding of a non-woven fibrous web, although it can be used to bond other fabrics, such as for example woven, stitch-bonded or knitted fabrics.

A surprising feature of the invention is the extremely short residence time that is required in order to achieve transfer of dyestuff compared to the residence times necessary in conventional heat-transfer printing techniques. Indeed, residence times of less than 1 second have been found to be perfectly adequate in most cases.

Bonding according to the method of the invention may conveniently be performed by passing the transfer sheet and fabric through the nip of a calender press, at least one of the rolls of which has a surface pattern of raised lands, so that the fabric is bonded and dyestuff is transferred thereto at least in areas where a raised land on one roll presses against the other roll or against a raised land on the other roll.

The temperature of the calender rolls and the pressure exerted therebetween must be sufficient to cause bonding and dye transfer, and may be higher than conventionally employed in bonding or heat-transfer printing processes. However, since bonding and transfer of dyestuff occurs mainly if not exclusively in spaced apart areas, (corresponding to the raised lands or areas of overlap of raised lands), glazing of the fabric that occurs is not sufficient to marr noticeably the appearance of the fabric. Furthermore the higher pressures causes some indentation of the fabric surface which further masks any glazing.

Calender presses suitable for the performance of the invention include those described in our British patent specification No. 1,245,088, our copending applications for letters patent numbers 18326/74 and 18369/74 and in British patent specification No. 1,093,740.

Alternatively the method of the invention may be performed by subjecting transfer sheet and fabric to heat and pressure in a nip between an ultrasonically energized horn and an anvil provided with a surface pattern of raised lands, whereby said thermoplastic material becomes adhesive and thereby bonds fibres together, and also said dyestuff transfers onto said web at least in areas where a raised land is in conjunction with the ultrasonically energized horn.

It is preferred that the fabric be forwarded through the nip between anvil and horn, and conveniently the anvil may be in the form of a driven roller.

Preferably the fabric comprises at least 50% more preferably 70%, meltable thermoplastic material which is conveniently in fibrous form. The term "fibre" includes both staple length fibres and continuous filaments. If desired, the fabric may be colored, for instance by conventional dyeing techniques or the fibres of the fabric may be spun-colored or stock-dyed before carrying out the process of the invention.

The transfer sheet will normally be a relatively inexpensive item resistant to the conditions to which it will be exposed. Paper is a suitable material, although metallic foil, for example, aluminum foil can be employed, and in some cases may even be preferred since it possesses good thermal conductivity, which, in the case of calendering enables the temperature of the calender rolls to be lowered to below the melting point of the thermoplastic material. As a consequence, the processability is improved since the risk of adhesion of molten thermoplastic material to the heated calender rolls is eliminated.

The transfer sheet may be preheated before reaching the nip, conveniently by causing it to come into contact with a heated roll, such as one of the calender rolls, before fabric and transfer sheet contact each other at the calender nip. If desired the transfer sheet may be coated with a release agent, such as silicon waxes.

Dyestuffs which may be used in the present invention are any of the class of disperse dyestuffs directly sublimeable at the working temperature and which hitherto comprised the most used class of transfer printing dyestuffs. Disperse dyestuffs of a lesser volatility normally precluding their use in conventional transfer printing surprisingly may also be used. Likewise reactive dyestuffs which are normally transferred in the presence of a liquid fixation agent in the fabric may be used. It is of course necessary that the dyestuff possess an affinity for the class of thermoplastic material present in the fabric. Furthermore the formulation of the ink containing the dyestuff needs to be such that the ink can transfer to the fabric, that is that its affinity for the supporting sheet material is not too great.

Depending upon the nature of the dyestuff and the thermoplastic material contained in the fabric it may or may not be necessary to treat the fabric subsequent to printing in accordance with the invention in order to fix the dyestuff. For example, we find that disperse dyestuffs are strongly fixed on polyester—containing fabrics without any fixing operation. On the other hand, with dyestuffs which are conventionally heat-transfer printed with a liquid fixation present in the fabric, we are able to dispense with the fixation agent and achieve dye fastness with a simple steaming step. We find that, when the thermoplastic material comprises a polyamide, it is generally necessary to steam the fabric and follow with a simple wash in hot water in order to achieve adequate dye fastness. In some cases the after treatment with steam may serve to distribute the dyestuff in the fabric beyond the areas which, in the case of calendering, are subjected to maximum pressure where a land on one calender roll nips the fabric against the other roll, or, in the case of ultrasonic treatment, where a land on the anvil is in conjunction with the ultrasonically energized horn.

Attractive fabrics having printed patterns on each surface can be made following the method of the invention, by contacting both surfaces of the fabric with transfer sheets supporting dyestuff formulations. For instance the patterns may be of the same or different colors, or one side may comprise a pattern of differing colors whilst the other side has a single color printed thereon.

The invention is further described in the following Examples and with reference to the accompanying drawing. Tests for fastness of dyestuff on the fabric were carried out in accordance with the following British Standard Test Methods:

I.S.O. Wash Test No. 3: BS 3661/17 : 1963
Fastness to Acid Perspiration: BS 3661/12 : 1963
Fastness to Rubbing: BS 2667 : 1961

Change in color was assessed on a Grey Scale as specified in BS 2662 : 1961, and Staining on to adjacent fabric samples was assessed on a Grey Scale specified in BS 2663.

DESCRIPTION OF THE FIGURE

In the FIGURE, 2 represents the transfer sheet; 4 represents the web. Numerals 6 and 8 refer to rolls which have raised lands on their surfaces and define a nip through which the web 4 and transfer sheet 2 proceed to be bonded. After passing through said nip, the transfer sheet and web are wound up on rollers 10 and 11, respectively.

EXAMPLE 1

A web weighing 150 g.m$^{-2}$ of crimped polyester bicomponent fibres was made on a Rando Webber machine supplied by Curlator Corporation. The fibres had a sheath of a copolymer of ethylene terephthalate and ethylene isophthalate (therebeing 15 mole percent isophthalate groups) surrounding a core of polyethylene terephthalate, the ratio by volume of core to sheath being 67 to 33. The fibres were drawn to a count of 3.3 dtex, length 58 mm and were crimped by a stuffer-box technique with 3.5 crimps per cm and a crimp ratio of 34%. The web was lightly needle-punched (23 punches per square cm from both sides, needle penetration 4 mm).

A transfer sheet (reference number 2 in the drawing), being a reddish disperse dyestuff moisture consisting of CI Disperse Red 4, CI Disperse Orange 1 and CI Disperse Yellow 3 (such dyes being representative of dyes suitable for use in conventional heat-transfer printing processes), coated onto a sheet of paper was laid on top of the web 4, the dye being in contact with the web, and the combination was passed through the nip of a calender press. The rolls 6, 8 defining the nip had a pattern of raised lands on their surfaces. The rolls were as follows:

Upper roll (6)

Diameter 7¾ inches, length 1 m

The surface pattern was made by cutting a 14 start right-hand thread with a lead of 1.4 inches providing 10 continuous lands per inch each with an axial width of 0.068 inch and then by left-hand knurling at 14 threads per inch inclined at 3° to the axial direction leaving isolated lands with a circumferential width of 0.030 inch. This operation provided rectangular lands measuring 0.068 by 0.030 inch with their length substantially in the axial direction but skewed from it by a small angle of 3°.

Lower roll (8)

A thin walled steel tube with an outer diameter of 5.020 inches and an inner diameter of 4.498 inches, length 1 meter, capable of conforming to localized and transitory variations in the nip pressure to ensure that the nip pressure was maintained at a substantially uniform level as disclosed in our copending application No. 2394/73.

The surface pattern was made by cutting a single start left-hand thread at 14 threads per inch, leaving a continuous land of axial width 0.030 inch, and then horizontal milling grooves in the axial direction leaving isolated lands with a circumferential width 0.068 inch. These operations provided rectangular lands measuring 0.030 × 0.068 inch with their length in the circumferential direction.

The upper roll was heated to a surface temperature of 215° C and the lower roll to a surface temperature of 195° C. The web and transfer sheet were passed through the nip at a speed of 3 m/minute, after which the transfer sheet was separated from the web and both were wound up on rollers 10, 12 respectively.

It was found that fibres had bonded together in a pattern of discrete indented areas to form a non-woven fabric. Furthermore dye had transferred onto the fabric, the indented areas (corresponding to positions where lands on both rolls had overlapped) being dyed red with other areas (corresponding to positions where a land on one roll had coincided with a space between lands on the other roll) were slightly pink, indicating transfer of a small amount of dyestuff.

The fabric was subjected to tests for dye fastness, and the results are given in Table 1.

(The Grey Scales have values of 1 to 5, 5 indicating no change in shade or no staining, 1 indicating very substantial change in shade or considerable staining).

TABLE 1

| Test | S | M | N | C |
|---|---|---|---|---|
| ISO Wash Test No.3 | 4-5 | 5 | 3-4 | — |
| Perspiration Test(pH 5.5) | 5 | — | 4-5 | 5 |
| Dry Rubbing Test | — | — | — | 4-5 |
| Wet Rubbing Test | — | — | — | 4-5 |

S is the assessed change in the shade of the sample
M is the assessed stain on to adjacent white non-woven polyester fabric
N is the assessed stain on to an adjacent white bulked nylon fabric
C is the assessed stain on to an adjacent white cotton fabric

EXAMPLE 2

A web weighing 150 g.m$^{-2}$ of crimped polyamide bicomponent fibres was made in the same manner as described in Example 1. The fibres had a sheath of nylon 6 surrounding a core of nylon 66 the ratio by volume of core to sheath being 50 to 50. The fibres were drawn to a count of 3.3 dtex, length 50 mm and were crimped by a stuffer-box technique with 4.0 crimps per cm and a crimp ratio of 30%. The web was lightly needle-punched as in Example 1.

A paper transfer sheet 2, carrying a printed floral pattern made up of the dyestuffs Lanasol Yellow 4G (CI Reactive Yellow 39) Lanasol Orange G (CI Reactive Orange 29) Lanasol Red G (CI Reactive Red 83) Lanasol Blue 3G and 3R (CI Reactive Blue 69 and 50 respectively) was contacted with the web as before and the web and transfer sheet were passed through the calender press described in Example 1. (Lanasol is a Trade Mark of Ciba-Geigy Ltd.). In this case the upper roll temperature was 235° C and the lower roll temperature was 215° C; other conditions were unchanged.

It was found that fibres had bonded together in a pattern of discrete indented areas to form a bonded non-woven fabric. Dyestuff had transferred in areas corresponding to the indented areas, but was not fast.

The fabric was passed in the slack state through steaming apparatus in which it was treated with low pressure steam (at substantially atmospheric pressure) for 10 minutes and then air dried. This treatment, apart from fixing the dyestuffs also distributed the dyestuffs beyond the indented bonded areas so that substantially all of the surface of the fabric was coloured.

A portion of the fabric was rinsed off by treatment in hot water (60° C), and rinsed and unrinsed portions of the fabric were tested for dye fastness, with the results shown in Table 2.

TABLE 2

| | Sample Not Rinsed | | | Sample Rinsed | | |
|---|---|---|---|---|---|---|
| Test | S | M | C | S | M | C |
| ISO Wash Test No.3 | 4-5 | 4-5 | — | 4 | 5 | — |
| Fastness to Rubbing(Wet) | — | — | 2 | — | — | 4 |
| Fastness to Rubbing(Dry) | — | — | 3-4 | — | — | 4-5 |

S and C have the same significance as in Table 1;
M is the assessed staining onto an adjacent white polyamide non-woven fabric.

EXAMPLE 3

Various transfer papers bearing disperse dyestuffs of low volatilities, precluding their use in conventional heat-transfer printing were prepared. These papers were contacted with the web described in Example 1 and passed through the calender press and under the same processing conditions as set out in Example 1.

Dye fastness was assessed, following ISO Wash Test No. 3, and results are given in Table 3, S, M and N having the significance accorded in Table 1.

TABLE 3

| DYESTUFF | S | M | N |
|---|---|---|---|
| CI Disperse Yellow 42 (CI 10338) | 5 | 5 | 5 |
| Dyestuff of Example 1 of UK 1256093 (Yellow) | 5 | 5 | 5 |
| Dyestuff of Example 5 of UK 1256093 (Yellow) | 5 | 5 | 5 |
| Dyestuff of Example 1 of UK 1020303 (Yellow) | 5 | 5 | 4-5 |
| Dyestuff of Example 7 of UK 1016246 (Yellow) | 5 | 5 | 5 |
| CI Disperse Orange 13 (CI 26080) | 5 | 5 | 4-5 |
| CI Disperse Brown 1 (CI 11152) | 5 | 5 | 4-5 |
| Dyestuff of Example 9 of UK 859900 (Red) | 5 | 5 | 4-5 |
| Dyestuff of Example 5 of UK 1049039 (Navy Blue) | 5 | 5 | 5 |
| Dyestuff of Example 38 of UK 1284932 (Turquoise) | 5 | 5 | 5 |
| Dyestuff of Example 7 of UK 1284932 (Blue) | 5 | 5 | 4-5 |

EXAMPLE 4

Using samples of the web of polyamide fibres as described in Example 2, and the calender press of Example 1, various reactive dyes were transferred as before from a paper backing sheet and the fastness of the transferred dyes were assessed using ISO Wash Test No. 3 following a steam fixation treatment.

Results are given in Table 4.

TABLE 4

| | Unscoured | | | Scoured at 60° C for 5 mins | | |
|---|---|---|---|---|---|---|
| DYESTUFF | S | M | N | S | M | N |
| Nylomine Yellow P3R * (C.I. Reactive Yellow 34) | 4 | 4-5 | 4-5 | 4 | 4-5 | 4-5 |
| Nylomine Black P2R * (C.I. Reactive Black 11) | 4 | 4-5 | 4-5 | 4-5 | 4-5 | 4-5 |
| Procion Red MX5B+ (C.I. Reactive Red 2) | 4 | 5 | 5 | 5 | 5 | 5 |
| Procion Yellow MX8G+ (C.I. Reactive Yellow 7) | 4 | 5 | 5 | 5 | 4-5 | 5 |

* Fastness assessed following treatment with atmospheric steam for 1 minute.
+ Fastness assessed following treatment with atmospheric steam for 10 minutes.
(Nylomine and Procion are Registered Trade Marks of Imperial Chemical Industries Limited).

EXAMPLE 5

A web weighing 120 g.m$^{-2}$ consisting of the polyester bicomponent fibres described in Example 1 was formed and was passed, with one surface in contact with a low volatility disperse dyestuff formulation supported on a paper sheet between an ultrasonically energized horn and an anvil in the form of a driven roller. The horn was operated at 20 KHz with 25 μ peak-to-peak amplitude and was urged towards the anvil with an applied pressure of 20 psig. The roller (anvil) bore a pattern of lands, 0.5 mm square, arranged in a chequer-board pattern, there being 16 lands to the inch.

It was found that the web bonded under the action of the applied ultrasonic energy, and moreover dyestuff transferred on to the fabric in areas corresponding to the lands on the roller. It was observed that a larger quantity of dyestuff was transferred when the transfer sheet was positioned between the web and the roller, than when it was positioned between web and anvil.

The fastness of dyestuff was assessed after ISO Wash Test No. 3 and the results obtained were as follows:
(Table 5)

TABLE 5

| Dyestuff | Location of Transfer Sheet | S | M | N |
| --- | --- | --- | --- | --- |
| C.I. Disperse Yellow 42 (CI. 10338) | Between Horn & Web | 4–5 | 5 | 4 |
| | Between Anvil & Web | 4–5 | 5 | 4 |
| C.I. Disperse Orange 13 (CI. 26080) | Between Horn & Web | 4–5 | 4–5 | 4–5 |
| | Between Anvil & Web | 4 | 4–5 | 4–5 |

What we claim is:

1. A method of simultaneously dyeing and bonding a fabric comprising thermoplastic fibres, wherein a transfer sheet supporting an ink comprising a heat transferable dyestuff is contacted with said fabric, and the sheet and fabric are subjected to heat and pressure in spaced discrete areas such that the fabric becomes thermally bonded and the dyestuff is transferred from the transfer sheet to the fabric at least in areas corresponding to said discrete areas.

2. A method according to claim 1 wherein said fabric is a non-woven fibrous web.

3. A method according to claim 1 wherein said fabric is subjected to heat and pressure for less than 1 second.

4. A method according to claim 1 wherein the transfer sheet is preheated before being contacted with the said fabric.

5. A method according to claim 1 wherein the thermoplastic fibres are formed from a polyamide, the dyed and bonded fabric being further subjected to a steam treatment followed by a hot water wash.

6. A method according to claim 1 wherein heat and pressure are supplied in a nip between an ultrasonically energized horn and an anvil provided with a surface pattern of raised lands, the transfer sheet being positioned between the fabric and the anvil.

7. A method of printing and bonding a fabric of thermoplastic fibers comprising
contacting the surface of the fabric with a transverse sheet which supports an ink comprising a heat transferable dyestuff, and
subjecting said sheet and fabric to heat and pressure in spaced discrete areas,
the combination of said heat and pressure being effective to cause simultaneous (1) thermal bonding of said fabric in said spaced discrete areas and (2) transfer of the dyestuff from said transfer sheet to the fabric at least in areas corresponding to said spaced discrete areas.

* * * * *